Feb. 28, 1956  H. A. TOULMIN, JR  2,736,056
METHOD AND APPARATUS FOR FORMING PLASTIC FILM AND PRINTING IT
Filed May 27, 1952
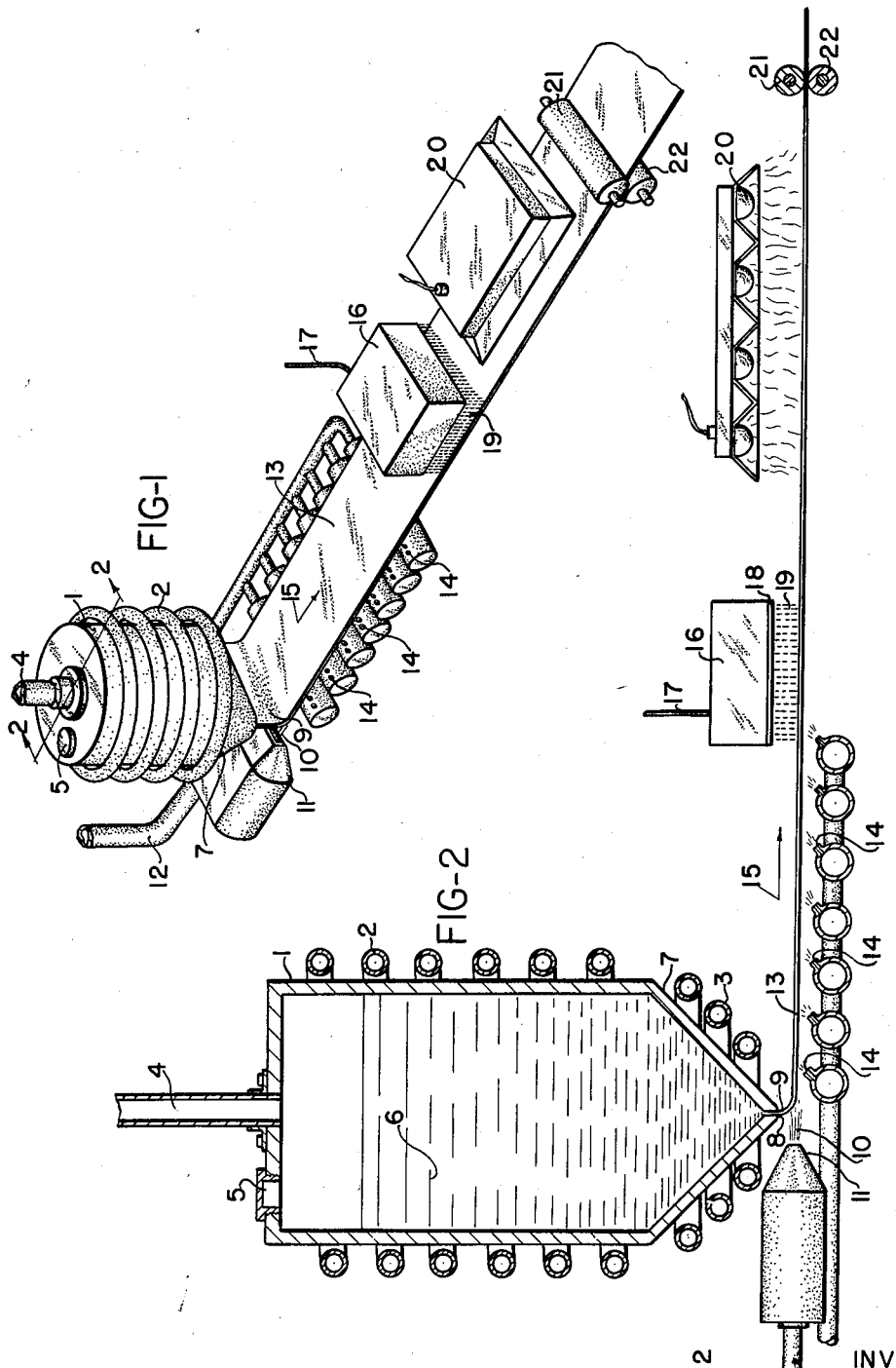
INVENTOR
HARRY A. TOULMIN JR.
BY Toulmin & Toulmin
ATTORNEYS

United States Patent Office 2,736,056
Patented Feb. 28, 1956

2,736,056

METHOD AND APPARATUS FOR FORMING PLASTIC FILM AND PRINTING IT

Harry A. Toulmin, Jr., Dayton, Ohio, assignor to The Commonwealth Engineering Co. of Ohio, Dayton, Ohio, a corporation of Ohio Application May 27, 1952, Serial No. 290,359

6 Claims. (Cl. 18—4)

This invention relates to the production of plastic film and a method of printing thereon.

It is the object of this invention to provide a method and apparatus for forming a plastic film at high speed without physical contact with the film until it is converted from a liquid state into the solid state.

It is a further object to provide means of treating the film to imprint upon it various configurations and colors.

It is also an object to provide a method and apparatus by which vinyl film can be formed from a liquid or viscous mass into a film of predetermined thickness without physical contact with the film until it becomes hard enough to handle without injury.

It is the basic object of this invention to provide a very high speed method of producing a film of plastic materials such as vinyl and to print it at high speed, in both cases being able to accomplish this result without physical contact with the film until after the operations of formation, printing and hardening have been completed.

These and other objects and advantages will become more apparent upon reference to the following description taken in connection with the accompanying drawings, in which:

Figure 1 is an isometric plan view showing the apparatus of this invention for the practice of the method of this invention.

Figure 2 is a section on the line 2—2 of Figure 1 looking in the direction of the arrows.

Referring to the drawings in detail, 1 is a tank which is heated by the heating coils 2 and 3. This tank is supplied with air pressure through the pipe 4. 5 is a removable plug for the filling of the tank with the plastic material 6.

The bottom of the tank is conical as at 7 and has a bottom aperture in the form of a slot at 8 through which the vinyl film or the like in its viscous, heated condition will flow under pressure from the air passing into the tank 1 from the pipe 4.

This film makes its exit from the slot 8 as at 9 where it is engaged by a cold air blast 10 from the nozzle 11 fed by the air pipe 12.

The film is then directed at right angles to its direction of flow as at 13 and is supported in that position by a plurality of air jets 14 which support it and also cause it to move in a horizontal plane as these jets are directed at an angle to the direction of movement of the film indicated by the arrow 15.

Thus, the film is moved in its plastic state without physical contact with the film as it is directed, supported and moved by air jets.

It will be understood that other gases may be employed which, in addition, will have a reactive effect upon the plastic film.

The tank 16 is supplied with photochemicals through the pipe 17. The bottom of the tank as at 18 is provided with perforations or other means for applying the photochemicals 19 as indicated.

The vinyl sheet 13 thus coated that passes beneath the photochemicals 19 then passes beneath infrared ray lamps 20 where the photochemical reacts to complete the printing. It is beyond this point when the film has been completed and is in its solid state that it comes into its first contact with the guide rollers 21 and 22.

It is thus possible to successfully draw at a regulated speed with a regulated viscosity and controlled direction a film, the thickness of which can likewise be controlled.

It is thus possible to direct the movement of the film, support it and cooperate in directing it, without the film being marred or slowed in its operation by contact with any physical means for moving it. By the use of the pressure above the film and the regulation of the size of the exit slot and the adjustment of the temperature, direction and nature of the air blast, a simple, cheap and very fast method of drawing vinyl film can be effected.

While still being so supported on air blast, the photochemicals are applied and then suitable lamps supply the heat for effecting the reaction of the photochemicals with the film.

It will be understood that varying designs can be thus imprinted upon the film, that a plurality of means of delivery of photochemicals can be employed and a plurality of different types of heating with different wave lengths can be employed in order to selectively cause reaction with the particular photochemicals.

The foregoing invention eliminates the previous difficulties of marring, scarring of film and, in particular, the cause of physical blemishes due to the inability to pull the film evenly when in its plastic state.

It has also been a problem to secure sufficient speed of drawing the film and of printing. It is a further object to eliminate any physical contact either of the drawing rolls or of the printing rolls or printing plates.

It will be understood that I comprehend within this invention the use of light sources and heat sources of different wave lengths and of photochemicals that are adaptable to be actuated both as to their fixation, the impregnation of the vinyl film and the type of color they produce according to the amount of heat and the wave length of the light employed.

I desire to comprehend within the following claims such variations and modifications as may be fairly comprehended within the scope of the claims as this invention is adapted to varying uses and conditions as well as mechanisms.

I claim:

1. In a method of forming a plastic film, maintaining the film material in a plastic condition, applying a constant heat to the plastic film material to cause it to be extruded, directing and supporting the film as extruded without mechanical contact by blasting air on said extruded film, regulating the quantity and direction of said air blasts subsequently, applying photochemicals to the film and applying light and heat to the film to actuate said photochemicals and fix them in printed form upon the film, said application of photochemicals and heating of said film being carried out while the film is supported by blasting air.

2. In a method of photoprinting, the step (a) of forming a plastic film; the step (b) of moving said film while in its plastic state without any mechanical contact therewith; the step (c) of applying photochemicals thereto as the film moves and is supported only by jets of gas directed thereagainst; and the step (d) of actuating the photochemicals by light and heat as the film moves, said light and heat being applied to said film as the same is supported by gas jets directed thereagainst.

3. In combination, a plastic containing tank, means for heating the contents of the tank, means for applying gas pressure to the contents of the tank, said tank having an aperture for the exit of the plastic material, and means for directing, supporting and hardening the plastic material in the form of a continuous length film as it moves from the container comprising a plurality of gas jets arranged longitudinally of said film, at least one of said jets being arranged to direct gas against said film at an angle thereto to determine the direction of the film and at least one or more of the other jets being arranged to assist in moving the film while being supported upon a gas whereby any mechanical contact with the film after extrusion is eliminated until it hardens.

4. In combination, a plastic containing tank, means for heating the contents of the tank, means for applying gas pressure to the contents of the tank, said tank having an aperture for the exit of the plastic material, means for directing, supporting and hardening the plastic material suspended in air as it moves from the container comprising a plurality of air jets, at least one of said jets being arranged to determine the direction of the film and at least one or more of the other jets being arranged to move the film and support it out of contact with solid bodies whereby the film is suspended in air while in its plastic state after extrusion and remains suspended until it hardens, and means for applying photochemicals to the film as it moves prior to hardening thereof and means for fixing and activating said chemicals to form a printed design on the plastic film.

5. In a method of forming a printed film of plastic material which comprises extruding plastic material in the form of a continuous film and subjecting the extruded film to printing and curing to produce a finished printed film, the improvement step of supporting said film while being printed upon by the application of a plurality of jets of gas directed against said film whereby the same is supported free of physical contact while being printed upon.

6. In a method of photoprinting a continuous length of plastic film, which comprises forming a film from plastic material, supporting said film while the same is moved longitudinally therealong by directing a plurality of gas jets thereagainst, subjecting said film as the same is moved therealong to the action of photochemicals while said film is supported by said gaseous jets and curing said treated film to produce a plastic film having a design thereon.

References Cited in the file of this patent

UNITED STATES PATENTS

| | | |
|---|---|---|
| 2,151,476 | Kimble et al. | Mar. 21, 1939 |
| 2,177,633 | Blackard | Oct. 31, 1939 |
| 2,289,774 | Graves | July 14, 1942 |
| 2,303,340 | Dreyfus | Dec. 1, 1942 |
| 2,627,088 | Alles et al. | Feb. 3, 1953 |